(12) United States Patent
Klein et al.

(10) Patent No.: US 11,790,210 B1
(45) Date of Patent: *Oct. 17, 2023

(54) HEIRARCHICAL PREDICTION MODELS FOR UNSTRUCTURED TRANSACTION DATA

(71) Applicant: Ex Parte, Inc., Bethesda, MD (US)

(72) Inventors: Jonathan Klein, Bethesda, MD (US);
Roman Weisert, Bethesda, MD (US);
Anton Zarovskiy, Bethesda, MD (US);
Ivan Hornachov, Bethesda, MD (US)

(73) Assignee: Ex Parte, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,430

(22) Filed: Jun. 7, 2021

Related U.S. Application Data

(63) Continuation of application No. 16/779,916, filed on Feb. 3, 2020, now Pat. No. 11,030,516.

(51) Int. Cl.
*G06N 3/042* (2023.01)
*G06N 3/08* (2023.01)
*G06F 16/25* (2019.01)
*G06N 3/082* (2023.01)

(52) U.S. Cl.
CPC ........... *G06N 3/042* (2023.01); *G06F 16/258* (2019.01); *G06N 3/08* (2013.01); *G06N 3/082* (2013.01)

(58) Field of Classification Search
CPC .......... G06N 3/02; G06N 3/04; G06N 3/0427; G06N 3/08; G06N 3/082; G06N 3/084; G06N 20/00; G06N 20/10; G06N 20/20; G06N 3/042; G06N 3/088; G06F 16/258
USPC .......................................................... 706/12
See application file for complete search history.

(56) References Cited

U.S. PATENT DOCUMENTS

| | | | |
|---|---|---|---|
| 11,030,516 | B1 | 6/2021 | Klein et al. |
| 2015/0170056 | A1 | 6/2015 | Breckenridge et al. |
| 2018/0053114 | A1 | 2/2018 | Adjaoute |
| 2019/0043055 | A1 | 2/2019 | Kar et al. |
| 2019/0236135 | A1* | 8/2019 | Tyamagondlu Nagabhushan ....... G06N 3/08 |
| 2020/0285943 | A1* | 9/2020 | Perera .................. G06N 3/0472 |
| 2020/0356851 | A1* | 11/2020 | Li .......................... G06F 16/353 |
| 2021/0264272 | A1* | 8/2021 | Luo ...................... G06N 3/0454 |

\* cited by examiner

*Primary Examiner* — Shane D Woolwine
(74) *Attorney, Agent, or Firm* — Fish & Richardson P.C.

(57) ABSTRACT

Systems and techniques are described for improving the evaluation of unstructured transaction data to, for example, recognize reoccurring data patterns or patterns of interest, predict future outcomes using historical indicators, identify attributes of interest, or evaluate likelihoods of certain conditions occurring. For example, a system can transform unstructured public record data obtained from multiple independent public data sources according to a hierarchical data model. The hierarchical data model can specify nodes within different data layers of a data hierarchy and classification labels corresponding to each of the nodes. In this way, the system can utilize data transformation techniques to permit the processing of information within unstructured transaction data that would have otherwise been impossible to perform without initially structuring the data according to the hierarchical data model.

20 Claims, 10 Drawing Sheets

HEIRARCHICAL PREDICTION MODELS FOR UNSTRUCTURED TRANSACTION DATA

CROSS-REFERENCE TO RELATED APPLICATION

This application is a continuation of U.S. application Ser. No. 16/779,916, filed Feb. 3, 2020, now allowed, which is incorporated by reference.

TECHNICAL FIELD

This specification generally describes technology related to machine learning, and more particularly, to technology related to transaction processing systems.

BACKGROUND

Data analytics software can be employed to improve the discovery, interpretation, and communication of meaningful patterns in data. Identified patterns can be used for certain types of decision-making. For example, organizations can use historical data patterns identified within transaction data to more accurately describe, predict, and evaluate the likelihood that a subsequent data pattern will occur in the future. Specifically, areas within analytics can include predictive analytics, prescriptive analytics, enterprise decision management, descriptive analytics, cognitive analytics, retail analytics, supply chain analytics mix modeling, web analytics, among others.

SUMMARY

This disclosure describes data transformation techniques that can be used to improve the evaluation of unstructured transaction data to, for example, recognize reoccurring data patterns or patterns of interest, predict future outcomes using historical indicators, identify attributes of interest, or evaluate likelihoods of certain conditions occurring. For instance, the system disclosed herein can transform unstructured public record data obtained from multiple independent public data sources according to a hierarchical data model. The hierarchical data model specifies nodes within different data layers of a data hierarchy and classification labels corresponding to each of the nodes. The system can also use language processing techniques to assign classification labels to individual transaction records so that they can be evaluated in relation to each of the classification labels. In this way, the system utilizes the data transformation techniques to permit the processing of information within unstructured transaction data that would have otherwise been impossible to perform without initially structuring the data according to the hierarchical data model.

This disclosure also describes systems and techniques that are capable of applying machine learning techniques to dynamically identify likelihoods of certain transaction conditions occurring based on evaluating historical transaction data. In some implementations, the system can dynamically predict the likelihood of successfully winning a legal case based on a set of user-specified input parameters (e.g., law firm considered for representation, a judge to preside over the case, a court in which the case will be filed, a cause of action to be sought in the case, etc.) and the evaluation of historical transaction data associated with the input parameters (e.g., prior cases that were handled by the law firm, prior judicial decisions written by the judge, decisions issued in prior cases filed at the court involving the same cause of action). In this way, the system can be used to a legal activity modeling tool that can be used to evaluate the outcomes of a legal case.

The system is capable of using different types of prediction models to provide various types of evaluations of legal case. For example, in some instances, the system is capable of predicting a generalized outcome, such as the likelihood of winning on the merits (i.e., receiving a final judgment in favor of a party seeking relief), given a set of input parameters associated with the case. In other instances, the system is capable of predicting specific aspects of a case, such as the likelihood of a procedural motion being granted or the likelihood of an adverse party taking a substantive position in the legal case. For example, the system can evaluate prior transaction data of a court to determine the likelihood of a summary judgement being granted in a case involving a specified judge, cause of action, and facts associated with an underlying dispute. In this respect, the system can use combinations of different types of prediction models to provide predictions of varying degrees and scopes. For instance, the system may apply certain prediction models of general scope to produce predictions relating to overall outcome of a legal case, and other prediction models of narrow scope to produce predictions relating to specific aspects of a legal case.

The system described herein can process and evaluate transaction data in a manner that addresses limitations of other transaction processing systems. As discussed below, the system can apply a hierarchical model to transform unstructured transaction data obtained from multiple disparate transaction data sources so that information collected from the different data sources can be rearranged, reorganized, reclassified, or restructured to permit the use of prediction models to develop accurate data predictions. For example, because public record data obtained from different judicial systems is often stored in different formats, their use in identifying prevailing data trends often requires manual processing and formatting. The system addresses this and other limitations by employing, for instance, natural language processing techniques to automatically (i.e., with minimal or no human intervention) transform unstructured public record data into structured public record data with individual records that are indexed, cataloged, and stored according to a hierarchical data structure specified by the hierarchal data model.

As a simplified example, a hierachical model can specify three data layers—a court, a judge, and a cause of action. During the data transformation process, the system assigns classification labels for the three data layers to each individual database record so that individual database records, once stored or archived, can be retrieved according to specific constraints specified by a user query. For example, if case data for fifty cases are obtained from three distinct data sources, the information for the fifty cases is processed with respect to the three data layers so that they can be more easily accessed using the classification labels as an effective filtering mechanism (e.g., identifying only cases involving a tort action, cases that were presided by a certain judge, or cases in which new trial was sought but denied by the court). In this way, the use of classification labels, as described in detail below, allows the system to more effectively determine the cases from which patterns should be considered when performing a prediction based on a set of input parameters.

The system is also capable of using trained prediction models to perform predictions related to legal cases without any or minimal human intervention. For example, once a user submits a transaction query requesting the likelihood of succeeding in bringing a cause of action for patent infringement in a U.S. district court, the system can use the structured transaction data to identify all relevant cases that were (a) filed in the U.S. district court, and (b) involved a claim for patent infringement. The system can then select one or more prediction models that are each trained to output a score representing a likelihood that of a successful outcome based on evaluating features that are present in both the transaction query as well extracted from the relevant cases. For example, the system may apply a sentiment model that is trained to correlate negative sentiments in judicial decisions with adverse judgments to predict the likelihood that a party will receive an adverse judgment in a subsequent legal case. As another example, the system may apply a linguistic model that is trained to correlate certain linguistic patterns present within judicial decisions with final judicial outcomes to predict that the likelihood of similar final judicial outcome given the presence of similar linguistic patterns present within a preliminary judicial decision. Each of these example demonstrate the capability of the system to evaluate legal case data without requiring a human to perform the evaluation, thereby removing various cumbersome aspects associated with processing legal case data.

The automated prediction techniques disclosed herein also provide various improvements over existing manual processes often involved in the prediction of legal outcomes. As one example, predictions of legal outcomes often involve subjective judgments made by humans (e.g., practicing attorneys) and are often based on anecdotal experience. While these predictions can sometimes reflect accurate circumstances, they can also introduce certain biases that do not consider other factors beyond the scope of an attorney's area of expertise. For instance, a patent litigation attorney may be competent to render an opinion on the likelihood of successfully bring a patent infringement claim but is incompetent to render an opinion the likelihood of successfully bringing an antitrust claim that arises out of the same factual circumstances. Subjective assessments of legal outcomes therefore can sometimes prevent the appreciation of other types of data patterns that may otherwise be relevant to a particular set of factual circumstances.

The automated prediction techniques disclosed herein can be used to address the subjective limitations of manual processes to evaluate legal outcomes by collectively applying a set of prediction models that are each trained to apply a different type of evaluation technique when processing relevant case data. For example, the system can use a sentiment model that is trained to correlate sentiments with judicial outcomes (irrespective of the issues presented in the case), as well as a term model that is trained to identify the occurrence of terms that often result in favorable judicial outcomes. The system, in this example, can combine the outputs of the two models to generate a prediction that considers both a sentiment analysis of prior relevant judicial decisions as well as a term occurrence analysis. Because the system uses objective criteria to generate predictions, the automated prediction techniques it applies can be used to remove inherent subjective biases that are often involved in manual predictions based on experience or other similar evaluations.

In one general aspect, a computer-implemented method includes: obtaining, by a server system and from a plurality of disparate data source systems, unstructured transaction data identifying (i) a first set of transactions, and (ii) identification data for each transaction included in the first set of transactions; and generating, by the server system, structured transaction data based on applying a hierarchical data model to the unstructured transaction data. The hierarchical data model specifies (i) a plurality of data nodes that are each associated with a different data layer of the hierarchical data model, and (ii) a plurality of classification labels that each represent a different data type represented by the identification data. The structured transaction data identifies, for each transaction included in the first set of transactions, (i) a particular classification label assigned to a transaction and (ii) a particular data node assigned to the transaction.

The method also includes: determining, by the server system, that identification data for a second transaction is associated with a particular classification label that is assigned to the first set of transactions; providing, by the server system, the identification data for the second transaction to a prediction model trained to output, for different sets of transactions, a set of one or more output parameters that represent a prediction associated with the second transaction; receiving, by the server system and from the prediction model, data representing a particular set of one or more output parameters for the second transaction; and providing, by the server system, the data representing the particular set of one or more output parameters for output.

One or more implementations can include the following optional features. For instance, in some implementations, the prediction model is trained to identify one or more sentiments present within the different sets of transactions; and the particular set of one or more output parameters for the second transaction comprises an output parameter identifying a subset of transactions from among the first set of transactions that are determined by the prediction model to be associated with sentiments that correspond to sentiments represented by the second transaction.

In some implementations, the prediction model is trained to identify one or more linguistic patterns present within the different sets of transactions; and the particular set of one or more output parameters for the second transaction comprises an output parameter representing a subset of transactions from among the first set of transactions that are determined by the prediction model to be associated with linguistic patterns that correspond to linguistic patterns represented by the second transaction.

In some implementations, the method further includes: selecting, by the server system and based on the identification data for the second transaction, the prediction model from among a set of prediction models that are each trained to output, for each of different sets of transactions, a different set of one or more of output parameters.

In some implementations, the set of prediction models includes: a first prediction model that is trained to output a set of one or more output parameters that represent a predicted value for a transaction metric for the second transaction; and a second prediction model that is trained to output a set of one or more output parameters that represent a set of predicted attributes that are descriptive of the second transaction.

In some implementations, the prediction model includes an artificial neural network comprising a plurality of input layers, a plurality of hidden layers, and one or more output layers.

In some implementations, the prediction model includes a convolutional neural network.

In some implementations, generating the structured transaction data includes: parsing, by the server system and based on applying a natural language processor, text included in the identification data for transactions included in the first set of transactions; identifying, by the server system and based on parsing the text included in the identification data for the transactions included in the first set of transactions, a set of semantic features represented by the text included in the identification data for the transactions included in the first set of transactions; and determining a particular set of one or more classification labels, from among the plurality of classification labels specified by the hierarchal data model, that correspond to the set of semantic features represented by the text included in the identification data for the transactions included in the first set of transactions.

In some implementations, the unstructured transaction data includes a first subset of unstructured transaction data obtained from a first data source system that is associated with the first set of transactions, and a second subset of unstructured transaction data obtained from a second data source system that is associated with the first set of transactions. Additionally, the first subset of unstructured transaction data and the second subset of unstructured transaction data each specify a different format of identification data.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

In general, this disclosure describes data transformation techniques to improve the evaluation of unstructured transaction data, for example, to recognize reoccurring data patterns, predict future outcomes, or identify attributes of interest. For example, the system disclosed herein can transform unstructured public record data obtained from multiple independent public data sources according to a hierarchical data model. The hierarchical data model specifies nodes within different data layers of a data hierarchy and classification labels corresponding to each of the nodes. The system can use language processing techniques to assign classification labels to individual transaction records so that they can be evaluated in relation to each of the classification labels. In this way, the system utilizes the data transformation techniques to permit the processing of information within unstructured transaction data that would have otherwise been impossible to perform without initially structuring the data according to the hierarchical data model.

Figure 1A:
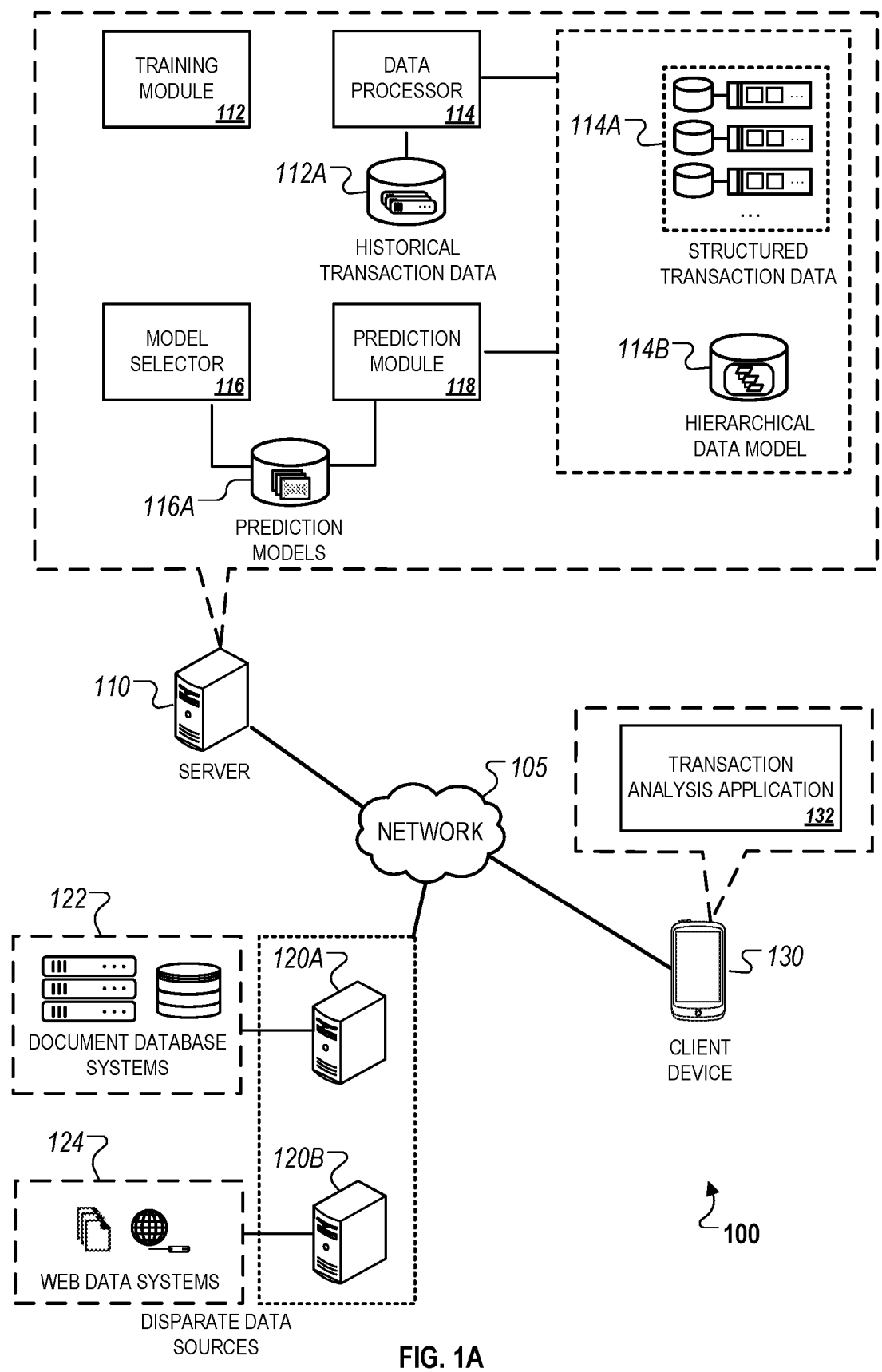
FIG. 1A illustrates an example of a data processing system

FIG. 1A illustrates an example of a data processing system 100. The system 100 includes a server 110, disparate data sources 120A and 120B, and a computing device 130 that exchange data communications over a network 105. The system 100 can be used to process and transform raw unstructured data obtained to structured data that can be evaluated for the presence of certain data patterns. For instance, raw data indicating transactions performed by an entity at distinct data sources can be processed to generate structured transaction data that can be evaluated to identify transaction patterns. In one particular example, case data for a court docket can be processed to generate a hierarchical model that indicates, for example, law firms representing plaintiffs and defendants in cases adjudicated by the court, presiding judges for the cases, and causes of actions asserted by the plaintiffs, among others. The hierarchical model can be used with machine learning techniques to process case data in order to identify the presence of patterns within the case data. For example, the hierarchical model enables the segmentation of case data by trial attorney and cause of action to compute a metric representing a likelihood of success of the trial attorney in representing a client in a subsequent action for the same cause of action. In this example, the metric is computed by determining the percentages of cases in which the trial attorney's clients previously prevailed for the cause of action relative to all cases filed at the court.

The server 110 includes various software modules, such as a training module 112, a data processor 114, a model selector 116, and prediction models 116A. The training module 112 can be used to use train the prediction models 116A using various types of training techniques. For example, the training module 112 can be configured to learn a function that maps an input to an output based on known examples of input-output pairs in training data. In this example, the training module 112 can infer a function from labelled training data that includes a set of training examples. The training module 112 can analyze the training data and produce an inferred function, which can be used for mapping new examples. In other examples, the training module 112 can be configured to use other learning techniques aside from supervised learning, such as unsupervised learning, semi-supervised learning, and/or reinforcement learning.

Figure 2:
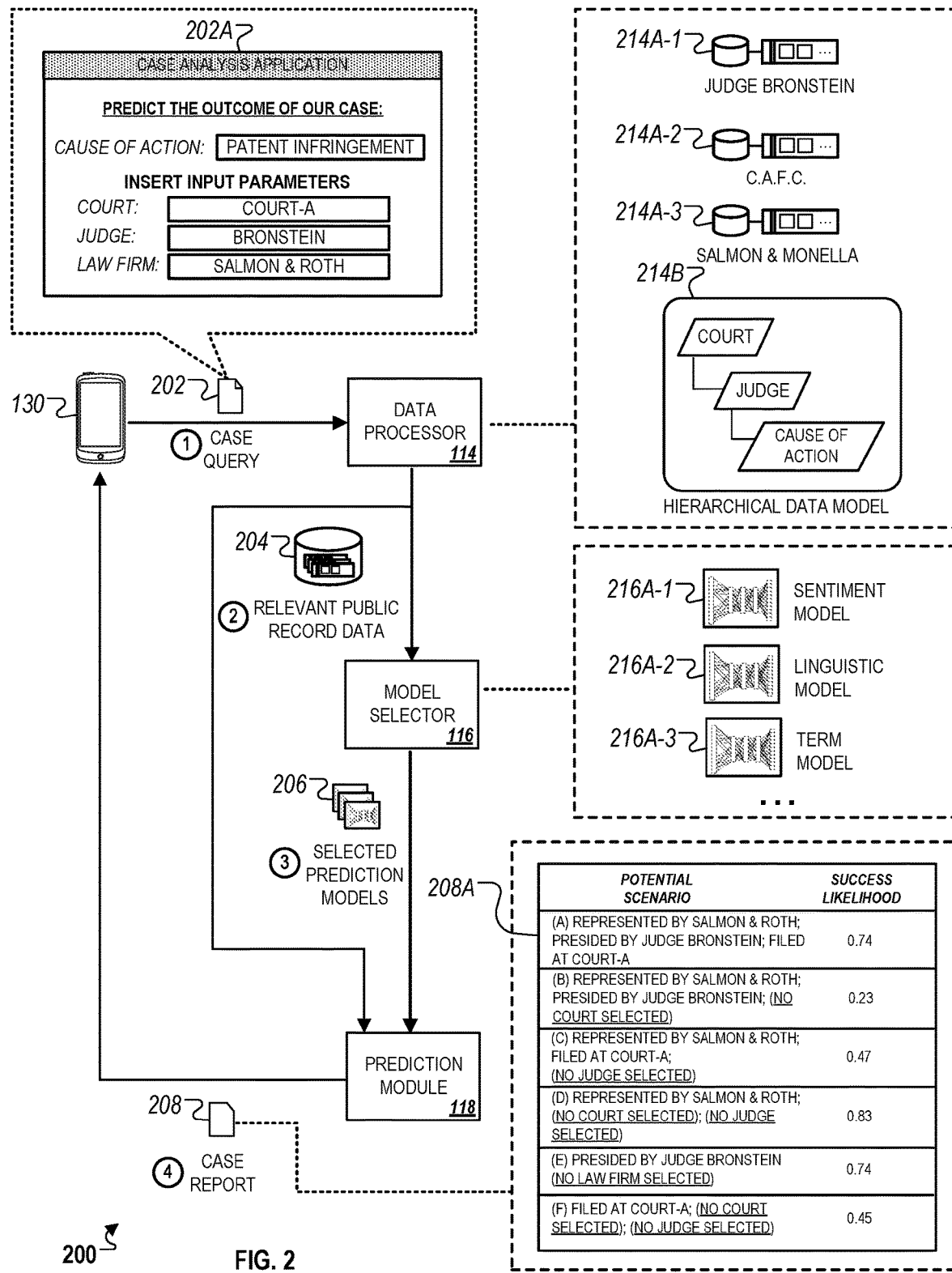
FIG. 2 illustrates an example of an outcome prediction technique for a legal case based on a set of user-specified input parameters.

The data processor 114 can be configured to transform raw unstructured data (e.g., document data stored in the document database systems 122, online data stored in the web data systems 124) using a hierarchical data model 114B to generate structured transaction data 114A. The transformation may involve identifying and assigning data labels specified in the hierarchical data model 114B to each record included in the raw unstructured data. The assignment of data labels is used to categorize and/or or segment the raw unstructured data within a hierarchical data structure specified by a hierarchical data model 114B. For example, as shown in FIG. 2, the hierarchical data model 114B can specify a first data label for a court that has an active docket for adjudicating cases involving legal claims, a second data label for a judge presiding over a specific case, and a third label for a cause of action alleged by a plaintiff in the specific case. In this example, the data labels are hierarchically arranged relative to one another to identify data patterns that are relevant to each label. For instances, data metrics for a judge can be computed by using the second data label to identify all cases in which the judge was identified as a presiding judge. Once generated, the structured transaction data 114A can be stored in a database 112A for additional processing and/or evaluation. The database 112A can also include structured transaction data that was previously generated by the data processor 114, as well as historical transaction data associated with the data obtained from the data sources 120A, 120B.

The prediction module 118 can evaluate the structured transaction data 114A using a set of prediction models 116A that are selected by the model selector 116. In some instances, the prediction module 118 computes prediction metrics based on applying the prediction model 116A to evaluate the structured transaction data 114A. For example, the prediction module 118 can apply a regression and/or prediction technique specified by a selected learning model on historical cases that have been previously tried by a trial attorney for a certain cause of action to compute a metric representing the likelihood of success in prevailing in a subsequent case in which the trial attorney is retained as legal counsel. Other examples of predictions include identifying, from among a list of trial attorneys, a trial attorney that is most likely to prevail in the subsequent case, identifying a judge that is most likely to rule favorably for a party in the subsequent case, causes of actions that are likely to be alleged by an opposing party, or the likelihood of certain events occurring during the subsequent case (e.g., the likelihood of winning a pre-trial motion, the likelihood of a settlement, the likelihood of the case going to trial, the likelihood of a successful appeal on a certain issue).

The disparate data sources 120A and 120B can be associated with, or managed by, distinct and independent organizations that manage and/or stores different types of transaction data. For instance, the data source 120A provides access to document database systems 122 storing document whereas the data source 120B provides access to web data systems 124 storing online activity information.

The computing device 130 can represent any type of computing device capable of network communications, such as a smartphone, a tablet computing device, a laptop computing device, a wearable device, a desktop computing device, or any others. The computing device 130 can include a transaction analysis application 132 that can be used to provide a user of the computing device 130 with access to various data analytics capabilities, e.g., predictive analytics, outcome determinations, among others.

Figure 1B:
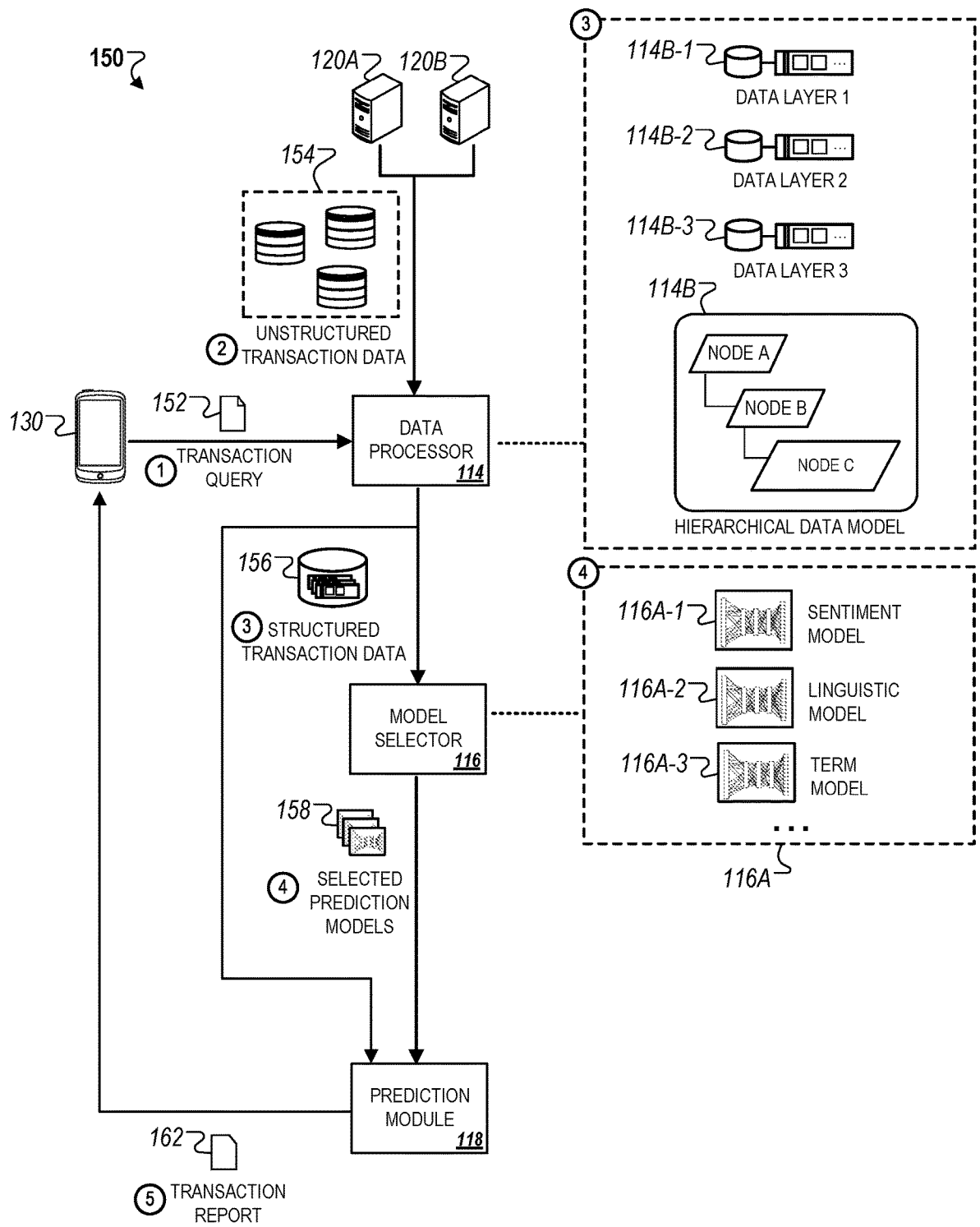
FIG. 1B illustrates an example of a process for transforming unstructured transaction data using a hierarchical data model.

FIG. 1B illustrates an example of a process 150 for transforming unstructured transaction data using the data processing system 100. The process 150 can be executed in a set of stages. At stage (1), the data processor 114 receives a transaction query 152 from the computing device 130. The transaction query 152 can include one or more data processing operations to be performed in association with unstructured transaction data 154 obtained from the data sources 120A, 102B. The transaction query 152 can be provided by a user of the computing device 130 through, for example, the transaction analysis application 132 (depicted in FIG. 1A). For instance, the transaction query 152 can specify predictive metrics to be computed for information represented within the unstructured transaction data 154. For example, the transaction query 152 can specify a predictive metric representing a likelihood of prevailing in a legal case, and a set of associated parameters that impact the predictive metric, such as a presiding judge, counsel for parties of the legal case, causes of actions asserted in the legal case, among others.

At stage (2) the data processor 114 retrieves unstructured transaction data 154 from multiple disparate data sources 120A and 120B. As discussed above, the unstructured transaction data 154 can include data that is stored by, or in association with, the data sources 120A, 120B. In some instances, the unstructured transaction data 154 can represent data corresponding to one or more legal cases. For example, the unstructured transaction data 154 can include case data for a pending case that is referenced in the transaction query 152 and currently being adjudicated by a court. In this example, the data sources 120A, 120B can store data for pending cases on the docket of the court (e.g., court filings, judicial orders, transcripts of proceedings, etc.). In this example, the unstructured transaction data 154 can also include case data for other cases (e.g., pending cases, terminated cases) that are determined to be relevant to metrics and/or parameters specified by the transaction query 152.

At stage (3), the data processor 114 transforms the unstructured transaction data 154 using the hierarchical data model 114B to generate structured transaction data 156. The data processor 114 can transform the unstructured transaction data 154 by generating multiple data layers within the structured transaction data 156, such as data layers 114B-1, 114B-2, and 114B-3 that each correspond to a different node within the hierarchical data model 114B. The data layers 114B-1, 114B-2, and 114B-3 can hierarchically represent information contained within the unstructured transaction data 154. For example, if the unstructured transaction data 154 includes data for cases filed with a court, then each data layer can be used to organize information to be used for processing. In this example, data layer 114B-1 represents a highest-level within the hierarchical model 114B (e.g., a judge that presides over the cases), data layer 114B-2 represents an intermediate-level within the hierarchical model 114B (e.g., causes of actions in cases), and data layer 114B-3 represents an lowest-level within the hierarchical model 114B (e.g., legal issues raised by the parties alleging the causes of actions). In this way, the structured transaction data 156 reorganizes the information within the unstructured transaction data 154 to allow the application of pattern recognition techniques to identify the occurrence of certain data trends and/or patterns.

At stage (4), the model selector 116 selects a set of prediction models 158 from among the prediction models 116A based on the structured transaction data 156. The prediction models 116A includes different models that are each trained to apply a distinct pattern recognition and/or learning techniques (e.g., natural language processing, text analysis, computational linguistics, biometrics) to process information included in the structured transaction data 156. For instance, the prediction models 116A can be configured, without limitation, to systematically identify, extract, quantify, and study affective states and subjective information.

In the example depicted in FIG. 1B, prediction model 116A-1 is a sentiment model that is trained to use natural language processing to identify the occurrence of sentiments within the structured transaction data 156 (e.g., text associated with positive sentiments, text associated with negative sentiments). Prediction model 116A-2 is a linguistic model that is trained to identify the presence of certain linguistic patterns within the structured transaction data 156 (e.g., syntactic patterns, extracted extractions, term relationships, multi-word expression patterns, etc.). Additionally, prediction model 116A-3 is a term model that identifies the occurrence of textual elements within documents (e.g., categorization, clustering, profiling, etc.).

The model selector 116 selects the prediction models 158 from among the prediction models 106 based on, for instance, the metrics and/or parameters specified in the transaction query 152. For example, if the transaction query 152 includes a metric for predicting the likelihood of prevailing in a case that is presided by a specific judge, the model selector 116 can select the prediction model 116A-1 to identify sentiments present in prior judicial decisions written by the specific judge. In this example, sentiments identified in recent judicial decisions for related cases (e.g., identical causes of actions or legal issues) can be used by the prediction model 116A-1 to determine how likely a party will prevail in a subsequent case. As another example, if the transaction query 152 includes a metric for predicting the likelihood of a case proceeding to trial, then the model selector 116 can select the prediction model 116A-3 to identify terms that identify pretrial motions in related cases (which is then processed to determine the percentage of cases with the pretrial motions that resulted in parties going to trial).

At stage (5), the prediction module 118 applies the selected prediction models 158 to evaluate data trends and/or patterns within the structured transaction data 156 and generates a transaction report based on the evaluation. The prediction module 118 can perform different types of evaluation depending on, for instance, the metrics and/or parameters that are specified in transaction query 152, the selected prediction models 158, and the type of information included in the structured transaction data 156. For example, in some instances, where the transaction query 152 includes a metric representing an overall likelihood of prevailing in a legal case based on a set of specified parameters (e.g., counsel for representation, causes of action, etc.), the prediction module 118 applies the selected prediction models 158 to perform coarse high-level evaluation to identify an overall likelihood of success. In other instances, where the transaction query 152 includes a metric representing a specific type of prediction (e.g., likelihood of winning a pretrial discovery motion), the prediction module 118 applies the selected prediction models 158 to perform narrower evaluation by processing only relevant information within the structured transaction data 156 (e.g., only cases with similar pretrial discovery motions being previously filed).

The prediction module 118 generates a transaction report 162, which includes results of the evaluation using the selected prediction models 158. The transaction report 162 can include values for metrics included in the transaction query 152 (e.g., a score representing an overall likelihood of success in a legal case) and associated information that may be of interest to a user of the computing device 130 (e.g., a list of relevant cases that were determined to have similar attributes and/or features as the parameters specified in the transaction query 152). For example, if the transaction query 152 specifies a presiding judge, then the transaction report 162 can include a list of recent cases in which the presiding judge issued a judicial order, along with any metadata representing any information that may be relevant to the transaction query 152.

FIG. 2 illustrates an example of an outcome prediction technique 200 using the data transformation technique shown in FIG. 1B. In this example, a user of the computing device 130 uses a case analysis application to access the data transformation and prediction techniques described throughout. For example, a user can use the case analysis application to obtain an automated prediction of a case outcome given a set of user-specified input parameters, such as a cause of action of a plaintiff, a court in which the plaintiff's case is filed, a judge presiding over the case, and a law firm representing the plaintiff. As discussed below, the outcome prediction depicted in FIG. 2 can be represented as one or more scores that indicate likelihoods of the plaintiff prevailing in obtaining relief (i.e., damages, injunctive relief) arising out of the cause of action.

The technique 200 can be executed in a set of stages. At stage (1), the data processor 114 receives a case query 202 from the computing device 130. The query 202 is submitted by a user of the computing device 130 through an interface 202A of the case analysis application. The interface 202A enables a user to select, for example, a cause of action of a case to be evaluated, and one or more values for input parameters to be used in outcome prediction. In the example depicted in FIG. 2, the user specifies a "PATENT INFRINGEMENT" cause of action to be filed in court "COURT-A," with a presiding judge "BRONSTEIN," and a law firm "SALMON & ROTH" for representation.

At stage (2), the data processor 113 identifies relevant public records data 204 and processes the data 204 using a hierarchical data model 214B to generate structured public record data. The public records data 204 can be obtained from various data sources that store data for cases that have been adjudicated and/or are pending on a docket. For example, the public records data 204 can include court filings, judicial orders or decisions, public submissions, among other types of information.

At stage (3), the model selector 116 selects a set of models 206 from among prediction models 216A-1, 216A-2, and 216A-3. The set of models 206 includes a prediction models 216A-1, 216A-2, and 216A-3 to evaluate the public records data 204 with respect to sentiment, linguistics, and terms, as discussed above in reference to FIG. 1B.

At stage (4), the prediction module 118 applies the selected prediction models 206 to evaluate the public record data 204 and generate a case report 208 based on the evaluation. The case report 208 includes evaluation data 208A generated by the prediction module 118. As shown in FIG. 2, the evaluation data 208A identifies a set of possible scenarios for the legal case referenced in the case query 202.

The evaluation data 208A also identifies scores representing likelihoods of success predicted by the prediction module 118 for the possible scenarios for the case. The likelihoods are determined based on evaluating the public record data 204 using the selected prediction models 206 with respect to a set of conditions. For example, scenario (A) indicates that if a client is represented by "SALMON & ROTH," the case is presided by "JUDGE BRONSTEIN," and the case is filed in "COURT-A," then the predicted likelihood of success is 0.74 (or 74%). The evaluation data 208A includes likelihoods of success for different combinations of conditions. For example, scenario (B) indicates that if the client is represented by "SALMON & ROTH" and the case is presided by "JUDGE BRONSTEIN" (but no court is selected), then the predicted likelihood of success is 0.23 (or 23%). Between these two examples, the scores indicate that a court filing in "COURT-A" has a significant impact on the likelihood of success.

The prediction module 118 provides for output to the case report 208 to the computing device 130. The computing device 130 can then access the evaluation data 208A through the interface 202A of the case analysis application. For example, the evaluation data 208A can be displayed through the interface 202A responsive to the user submitting the case query 202.

Figure 3:
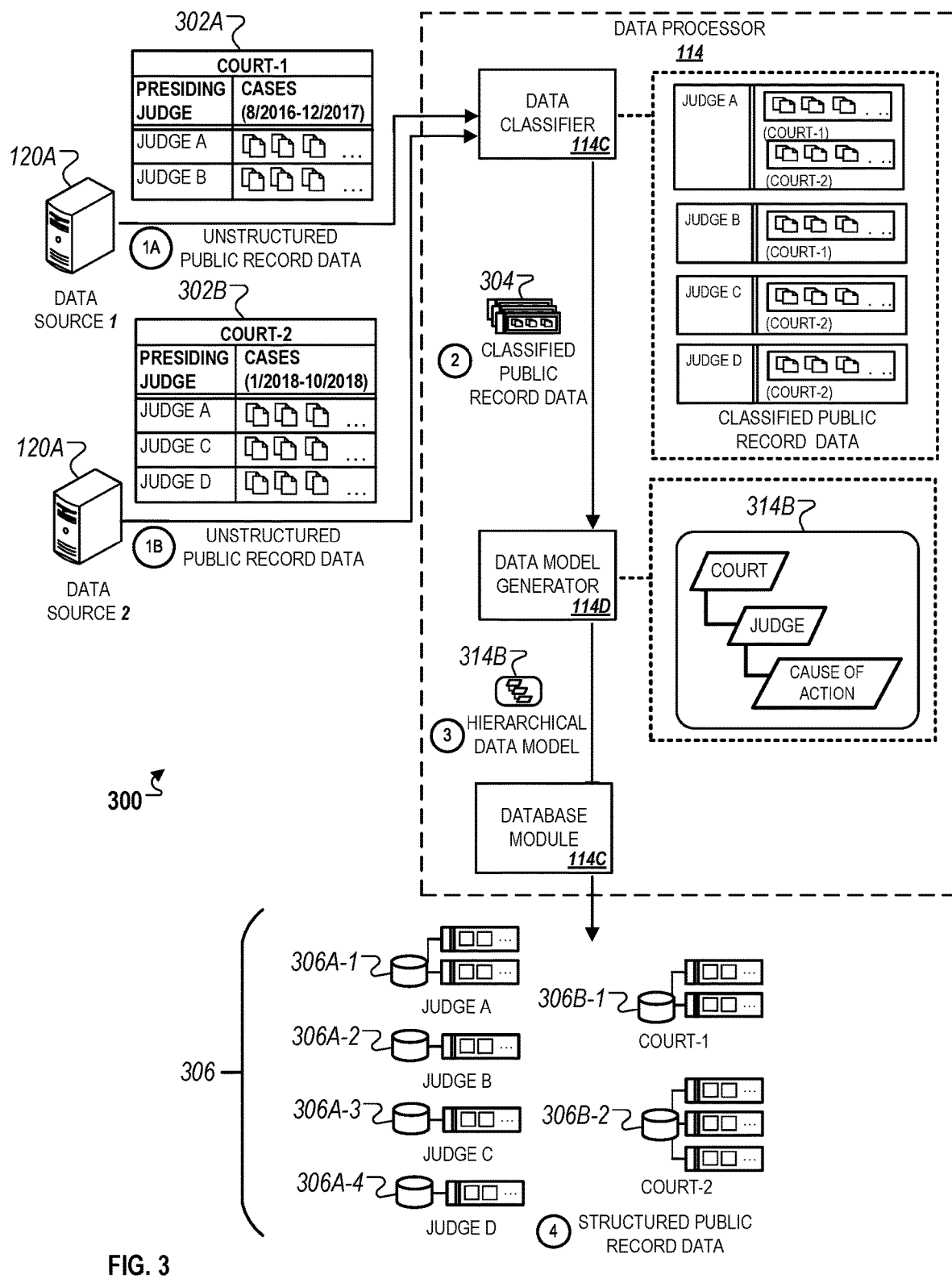
FIG. 3 illustrates an example of a data processing technique that generates a hierarchical data model for evaluating unstructured public record data.

FIG. 3 illustrates an example of a data processing technique 300 that generates a hierarchical data model to be used for evaluating unstructured public record data. In this example, unstructured public record data obtained from distinct and independent data sources are structured according a hierarchal data model to permit evaluation and analysis. For instance, the structured data can be used to index relevant public record data using data labels to isolate the impact of a certain parameter on the likelihood of success in a case. This allows the system to control for confounding variables that may impact prediction accuracy and/or precision.

The technique 300 can be executed in a set of stages. At stages (1a) and (1b), a data classifier 114C receives unstructured public record data 302A and 302B from data sources 120A and 120B, respectively. In the example, the public record data 302A includes information for a case filed at "COURT-1" during a specified time period (August 2016 to December 2017). Public record data 302B includes information for another case filed at "COURT-2" during another time period (January 2018 to October 2018). In this example, the data sources 120A and 120B are each associated with a docketing system of a different court (e.g., a state court in New York, a federal court in Washington D.C.). In this way, data stored in independent and distinct systems can be processed in parallel to increase the data throughput for performing predictions.

At stage (2), the data classifier 114C generates classified public record data 304 based on processing the unstructured public record data 302A and 203B with respect to a classification label (e.g., a presiding judge). The public record data 304 segments information included in the public record data 302A and 302B using distinctive data labels that are each associated with a different presiding judge. In the example, the public record data 304 classifies and reorganizes information as being associated with a judge from among four judges (e.g., "JUDGE A," "JUDGE B," "JUDGE C," "JUDGE D").

At stage (3), a data model generator 114D generates a hierarchical data model 314B based on the classified public record data 304. The hierarchical data model 314B includes nodes that are each associated with a data label (e.g., "COURT," "JUDGE," "CAUSE OF ACTION"). Information within the public record data 304 is processed to identify the data labels to be included in the hierarchical data model 314B. The hierarchical data model 314B also specifies a tree-based hierarchical structure that organizes each node within a set of levels. This structure can be used to identify different scopes associated with each data label. In the example, the node for the "COURT" data label is in a higher level than the node for the "JUDGE" data label and the node for the "CAUSE OF ACTION" data label. With this structure, for instance, 50 cases may be relevant to a particular "COURT" label (e.g., cases filed at "COURT-1"), 20 cases may be relevant to a particular "JUDGE" label (e.g., 20 out of 50 cases have been presided by "JUDGE BRONSTEIN"), and 5 cases may be relevant to a particular "CAUSE OF ACTION" label (e.g., 5 out of 20 cases presided by "JUDGE BRONSTEIN" allege a breach of contract action). The hierarchical data model 314B thereby allows the data processor 114 to effectively filter, mine, and/or sort public record data when identifying information to evaluate in generating predictions.

At stage (4), a data model 114C generates structured public record data 306 for storage in a database associated with the system 100. The structured public record data 306 reorganizes the information contained in the public record data 302A and 302B into datasets for the "JUDGE" data label (e.g., datasets 306A-1, 306A-2, 306A-3, 306A-4) and datasets for the "COURT" label (e.g., datasets 306B-1 and datasets 306B-2). The segmentation ensures that relevant information (e.g., legal cases filed at a particular court, legal cases presided by a particular judge) can be more easily identified and used for generating predictions. For example, if a user specifies a request to generate a prediction for a case to be filed with "JUDGE A," then the data processor 114 can evaluate only dataset 306A-1 and avoid having to process datasets 306A-2, 306A-3, and 306A-4, thereby reducing the processing burden in generating the prediction.

Figure 4:
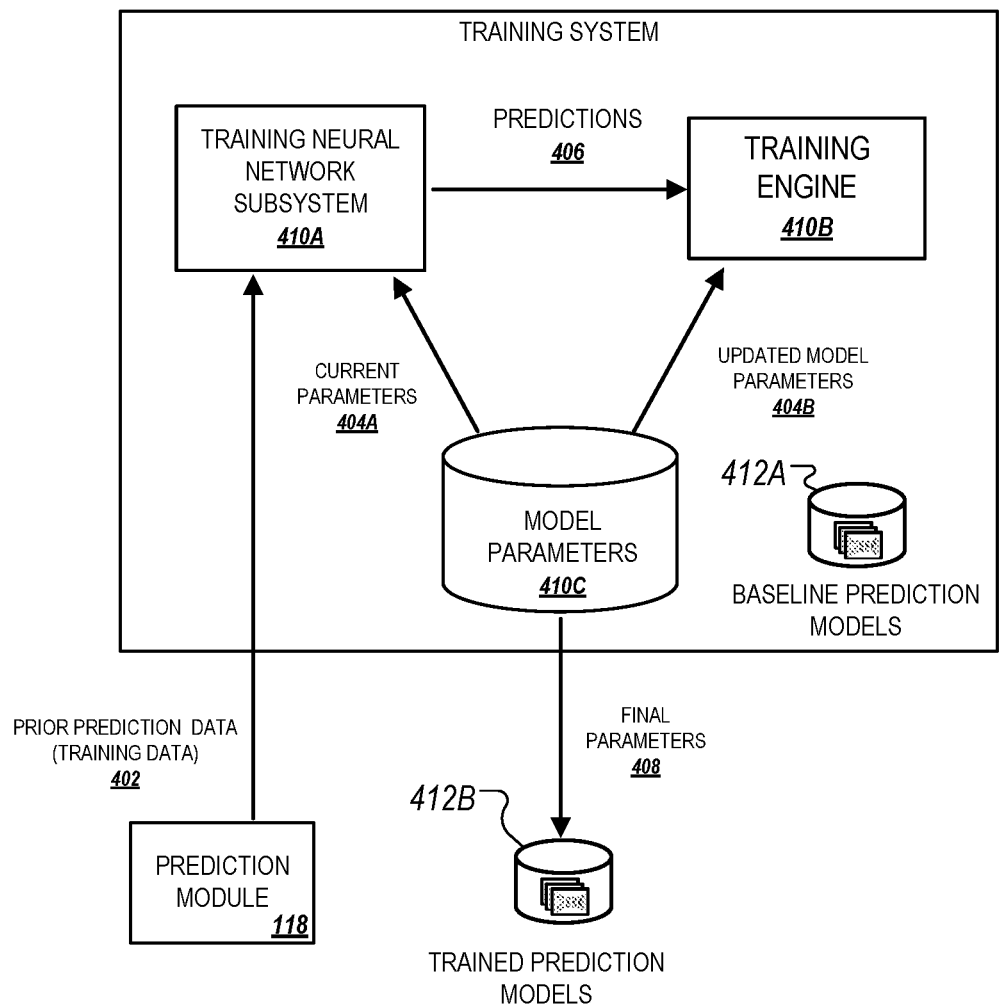
FIG. 4 illustrates an example of a system that can be used to train prediction models for predicting the outcome of a legal case.

FIG. 4 illustrates an example of a system 400 that can be used to train prediction models for generating predictions for transaction data. The system 400 can be hosted within a server system (e.g., the server 110), which can be a distributed computing system having hundreds or thousands of computers in one or more locations.

The system 400 includes a training neural network subsystem 410A that can implement the operations of each layer of a neural network that is designed to make predictions from prior prediction data 402 received from the prediction module 118. The training neural network subsystem 410A includes a plurality of computing devices having software or hardware modules that implement the respective operations of each layer of the neural network according to an architecture of the neural network.

The training neural networks generally have the same architecture as similar neural networks. However, the system 400 need not use the same hardware to compute the operations of each layer. In other words, the system 400 can use CPUs only, highly parallelized hardware, or some combination of these.

The training neural network subsystem 410A can compute the operations of each layer of the neural network using current values of model parameters 404A stored in a collection of model parameters 410C. Although illustrated as being logically separated, the model parameters 404A and the software or hardware modules performing the operations may actually be located on the same computing device or on the same memory device.

The neural network subsystem 410A can receive training examples within the prior prediction data 402 as input. The training examples can include auto-labeled training data, human-labeled training data, or some combination of the two. Each of the training examples includes information representing discrete transactions (e.g., records associated with legal cases) as well as one or more labels that indicate outcomes associated with the transactions (e.g., motions granted or denied by a court, winning or losing parties in a litigation, etc.). In some implementations, training examples 123 can include multiple types of outcomes for one or more transactions (e.g., cases that went to trial and a outcome of the trial).

The training neural network subsystem 410A can generate, for each training example, one or more predictions 406. A training engine 410B analyzes the predictions 406 and compares the predictions 406 to the labels in the training examples of the prior prediction data 402. The training engine 410B then generates updated model parameter values 404B by using an appropriate updating technique, e.g., backpropagation. The training engine 410B can then update the collection of model parameters 410C using the updated model parameter values 410B. The training engine 410B can also use the updated model parameter values 410B to train baseline prediction models 412A to generate trained prediction models 412B.

After training is complete, the system 400 can provide a final set of model parameter values 408 for use with trained prediction models 412B in generating new predictions. The system 400 can provide the final set of model parameter values 408 by a wired or wireless connection to the prediction module 118.

Figure 5A:
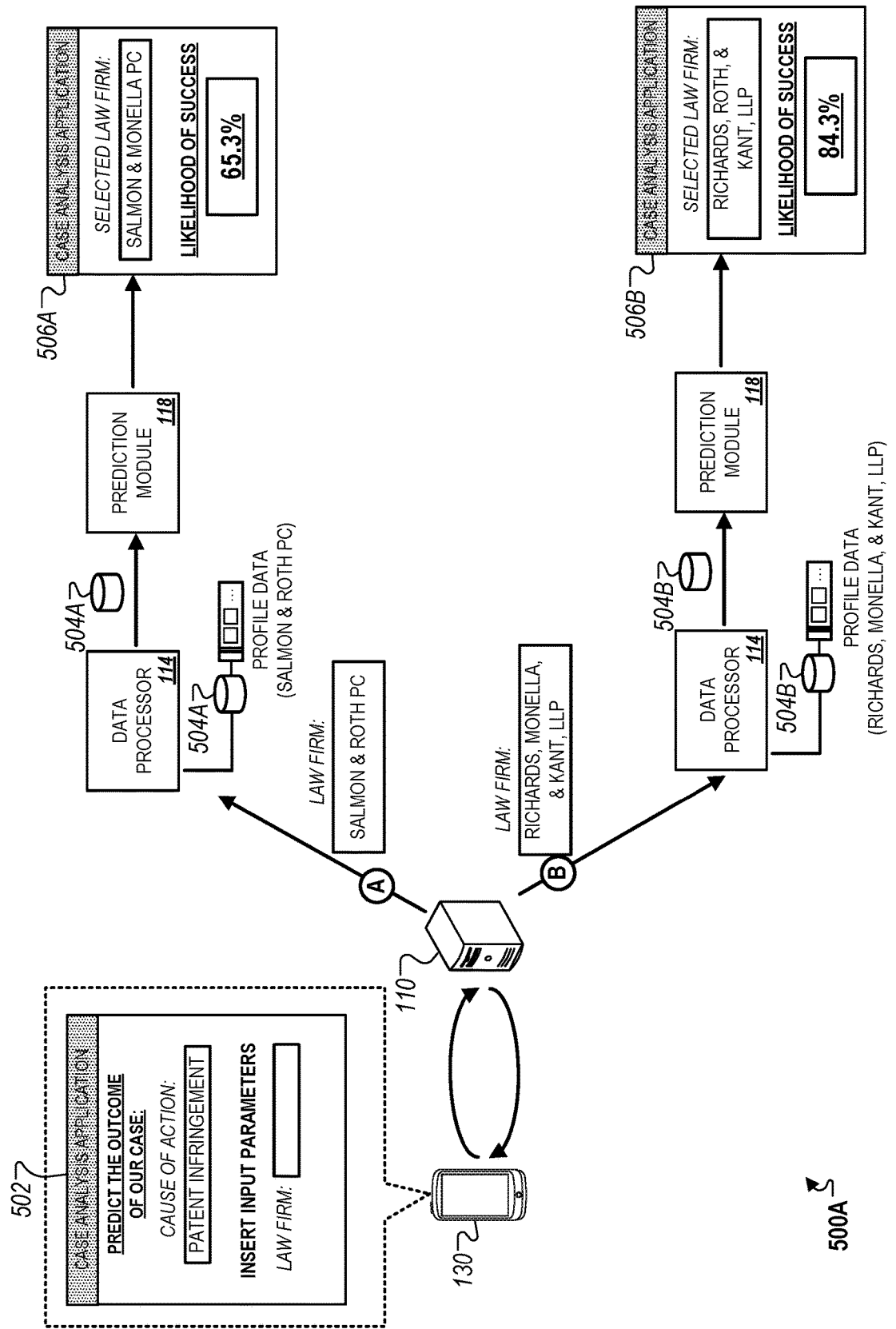
FIGS. 5A-5B illustrate examples of techniques for dynamically adjusting an outcome for a case based on user inputs for input parameters.
Figure 5B:
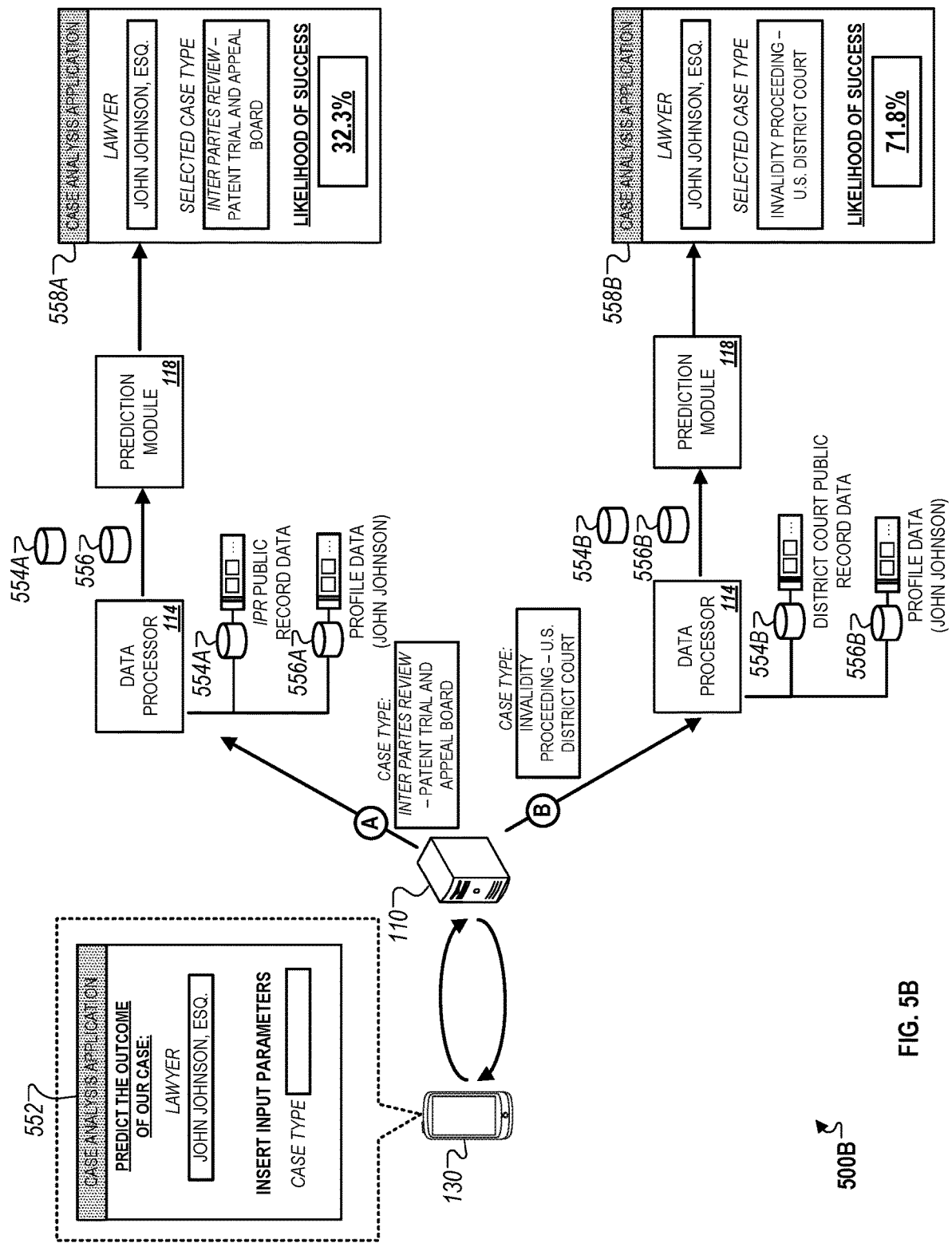

FIGS. 5A-5B illustrate examples of techniques for dynamically adjusting an outcome for a case based on user inputs for input parameters. Referring initially to FIG. 1A, an example of a technique 500A for dynamically determining the outcome of a case based on a law firm selected for representation in the case is depicted.

In the example, a user initially accesses an interface 502 of a case analysis application through the computing device 130. The user can specify a cause of action for a legal case (e.g., "PATENT INFRINGEMENT") and specify an input parameter for a law firm to represent a party in the legal case. In this example, the user can select a law firm from among two law firms (e.g., "SALMON & ROTH," "RICHARDS, MONELLA, & KANT") that are associated with case data stored in an associated database. Depending on the selection, the server 110 generates predictions using either process (A) or process (B), as shown in FIG. 5A.

If the server 110 generates predictions using process (A), then the data processor 114 accesses profile data 504A corresponding to "SALMON & ROTH" and the prediction module 118 uses the profile data 504A to generate a score representing a likelihood of a party prevailing in a case if "SALMON & ROTH" is selected as legal counsel for the case. Alternatively, if the server 110 generates predictions using process (B), then the data processor 114 accesses profile data 504B corresponding to "RICHARDS, MONELLA, & KANT, LLP" and the prediction module 118 uses the profile data 504B to generate another score representing a likelihood of a party prevailing in a case if "RICHARDS, MONELLA, & KANT, LLP" is selected as legal counsel for the case.

In the example depicted in FIG. 5A, processes (A) and (B) can be used to demonstrate a predicted impact of legal counsel on the outcome of a legal case. In this example, if the user selects "SALMON & MONELLA" as legal counsel, then an interface 506A is displayed on the computing device 130. Alternatively, if the user selects "RICHARDS, MONELLA, & KANT" as legal counsel, then an interface 506B is displayed on the computing device 130. The predicted likelihood of success for process (A) is 65.3%, whereas the predicted likelihood of success for process (B) is 84.3%. A user can therefore use the computed scores to assess which legal counsel to appoint for representation.

Referring now to FIG. 5B, an example of a technique 500B for dynamically determining the outcome of a case based on a type of case to be adjudicated case is depicted.

In the example, a user initially accesses an interface 552 of a case analysis application through the computing device 130. The user can specify a lawyer to appoint as lead trial counsel for a legal case (e.g., "JOHN JOHNSON"). The user can also specify an input parameter for a case type of the legal case. In this example, the user can select a case type from among two types of patent dispute cases (e.g., "INVALIDITY PROCEEDING—U.S. DISTRICT COURT," "INTER PARTES REVIEW—PATENT TRIAL AND APPEAL BOARD"). While both types of proceedings are broadly involve a determination of the validity of a issued U.S. patent, the first proceeding involves a case filed with a U.S. federal district court and the second proceeding involves a case filed with the Patent Trial and Appeal Board at the United States Patent Trademark Office.

Depending on the selection, the server 110 generates predictions using either process (A) or process (B), as shown in FIG. 5B. If the server 110 generates predictions using process (A), then the data processor 114 accesses public record data 554A of prior filed IPRs and profile data 556A corresponding to "JOHN JOHNSON." The prediction module 118 uses the public record data 554A and the profile data 556A to generate a score representing a likelihood of a party prevailing in an IPR proceeding with "JOHN JOHNSON" as lead counsel for the proceeding. Alternatively, if the server 110 generates predictions using process (B), then the data processor 114 accesses public record data 554B of prior filed invalidity cases at a U.S. district court and profile data 556B corresponding to "JOHN JOHNSON." The prediction module 118 uses the public record data 554B and the profile data 556B to generate a score representing a likelihood of a party prevailing in an invalidity proceeding at a U.S. district court with "JOHN JOHNSON" as lead counsel for the invalidity proceeding.

In the example depicted in FIG. 5B, processes (A) and (B) can be used to demonstrate a predicted impact of legal counsel on the outcomes of different types of proceedings involving similar elements of proof (e.g., proving that U.S. patent is valid or invalid). In this example, if the user selects an IPR proceeding, then an interface 558A is displayed on the computing device 130. Alternatively, if the user selects an invalidity proceeding before a U.S. district court, then an interface 558B is displayed on the computing device 130. The predicted likelihood of success for process (A) is 32.3%, whereas the predicted likelihood of success for process (B) is 71.8%. A user can therefore use the computed scores to determine, for instance, the best type of proceeding to file and whether a selected legal counsel has adequate experience for the representation.

Figure 6:
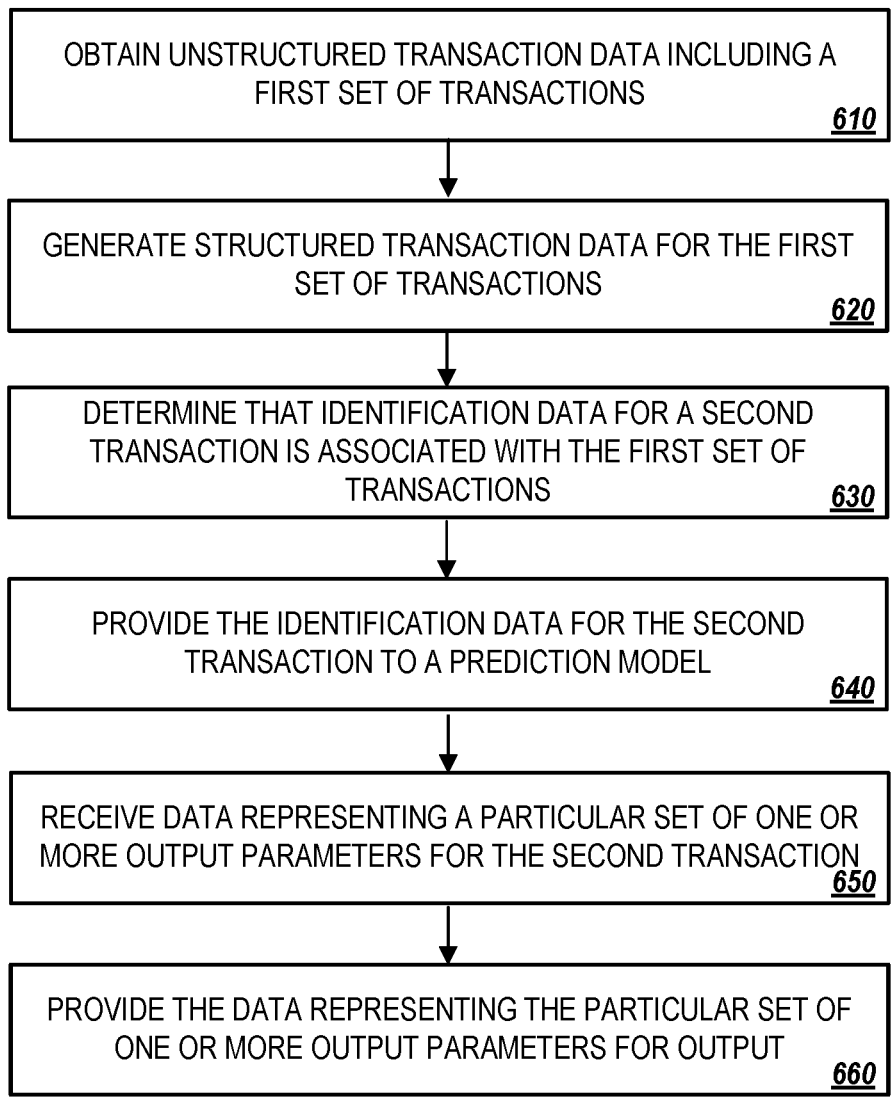
FIG. 6 illustrates an example of a process for transforming unstructured transaction data to perform predictive analytics using one or more prediction models.

FIG. 6 illustrates an example of a process 600 for transforming unstructured transaction data to perform predictive analytics using one or more prediction models. Briefly, the process 600 can include the operations of obtaining unstructured transaction data including a first set of transactions (610), generating structured transaction data for the first set of transactions (620), determining that identification data for a second transaction is associated with the first set of transactions (630), providing the identification data for the second transaction to a prediction model (640), receiving data representing a particular set of one or more output parameters for the second transaction (650), providing the data representing the particular set of one or more output parameters for output (660).

In more detail, the process 600 can include the operation of obtaining unstructured transaction data including a first set of transactions (610). For instance, the data processor 114 of the server 110 can obtain unstructured transaction data 154 from multiple disparate data source systems 120A and 120B. The unstructured transaction data 154 can identify a first set of transactions (e.g., documents associated with legal cases identified in public record data) and identification data for each transaction included in the first set of transactions. For example, the identification data can include metadata, classification information (e.g., document type), and other types of information that make the transaction identifiable.

In some implementations, the unstructured transaction data 154 includes a first subset that is obtained from a first data source system 120A that is associated with the first set of transactions. The unstructured transaction data 154 also includes a second subset obtained from a second data source system 120B that is also associated with the first set of transactions. For example, the first and second data source systems 120A can be different data systems that store public records associated with legal cases (e.g., a data system of a law enforcement agency and a data system of a judicial court). In such implementations, the first subset and the second subset each specify a different format of identification data. For example, data obtained from a law enforcement agency can include specific format used for processing police reports, whereas data obtained from an online docket of a judicial court can include another format used for processing notices provided to litigants.

The process 600 can include the operation of generating structured transaction data for the first set of transactions (620). For instance, the data processor of the server 110 can generate structured transaction data 156 based on applying a hierarchical data model 114B to the unstructured transaction data 154.

As discussed above, the hierarchical data model 114B specifies multiple data nodes (e.g., nodes "A," "B," and "C" in FIG. 1B) that are each associated with a different data layer of the hierarchical data model 114B. The nodes can be associated with classification labels to establish the hierarchical data structure specified by the model 114B. In the example depicted in FIG. 2, the hierarchical data model 214B includes three nodes that are each associated with a different classification label (i.e., "COURT," "JUDGE," and "CAUSE OF ACTION").

The structured transaction data 156, once generated, also rearranges data/information within the unstructured transaction data 154 according to the structure specified by the hierarchical data model 114B. For example, the structured transaction data 156 includes data records that identifies a classification label assigned to each transaction and a data node corresponding to the classification label. As an example, the unstructured transaction data 154 can identify all pending cases on a docket of a local circuit court. In this example, the structured transaction data 156 can rearrange data records of the pending cases so that individual data records are sorted by presiding judge and a cause of action implicated in each case. In this way, the structured transaction data 156 rearranges information of the unstructured transaction data 154 so that the information, once transformed, is organized and/or sorted by the classification labels to improve the analysis of related data records, as discussed below.

In some implementations, generating the structured transaction data includes the following sub-operations. For instance, the data processor 114 can parse, text included in the identification data for transactions included in the first set of transactions based on applying a natural language processor. The data processor 114 can then identify a set of semantic features represented by the text based on parsing the text included in the sets of identification data for the transactions included in the first set of transactions. The data processor 114 can then determine a particular set of one or more classification labels, from among the plurality of classification labels specified by the hierarchal data model, that correspond to the set of semantic features represented by the text included in the sets of identification data for the transactions included in the first set of transactions. For example, as discussed above in reference to FIG. 2, the data processor 114 can process unstructured public record data and assign classification labels to documents of legal cases based on the court in which a case if filed, a judge that presides over the case, and a cause of action implicated in the case. In this example, the unstructured data, once processed, is stored as data subsets assigned to classification labels 214A-1, 214A-2, and 214A-3.

The process 600 can include the operation of determining that identification data for a second transaction is associated with the first set of transactions (630). For instance, after generating and storing the structured transaction data 156, the data processor 114 can receive a transaction query 152 that references identification data for a second transaction. As discussed above, in some instances, the second transaction can represent a hypothetical scenario based on user-specified input parameters (as shown in FIG. 2). In such instances, the identification information can include a user-specified court, a user-specified judge, or a user-specified law firm for a transaction to be evaluated using modeling techniques.

The data processor 114 of the server 110 can determine that the identification data is associated with the first set of transactions by, for instance, determining that a user-specified input parameter within the identification data is associated with a classification label that is assigned to the first set of transactions. In the example depicted in FIG. 2, the identification data for the second transaction indicates an input parameter for judge as "BRONSTEIN," which is then used by the data processor 114 to determine that the identification data for the second transaction is associated with transactions within the first set of transaction that have been assigned the classification label 214A-1 (i.e., the classification label for Judge Bronstein).

The process 600 can include the operation of providing the identification data for the second transaction to a prediction model (640). For instance, the model prediction module 118 of the server 110 can provide the identification data included in the transaction query 152 to a prediction model. The prediction model can be trained to output, for different sets of transactions, a set of one or more output parameters that represent a prediction associated with the second transaction. In some instances, the output parameters can represent different types of predictions associated with the identification data for the second transaction. For example, as shown in FIG. 2, the output parameters can represent different types of predictions relating to the ultimate outcome of the second transaction (i.e., a likelihood that a party will prevail on a user-specified cause of action based on certain input parameters specified in the identification data for the second transaction).

In some implementations, the prediction model is trained to identify one or more sentiments present within the different sets of transactions. For example, as shown in FIG. 1B, the sentiment model 116A-1 can be trained to identify a subset of transactions from among the first set of transactions that are determined to be associated with sentiments that correspond to sentiments represented by the second transaction. In this example, the sentiment model 116A-1 can identify sentiments associated with transactions that are similar to the second transaction and make inferences on sentiments that are likely to be associated with the second transaction. For example, if a prior decisions by a certain judge for a given cause of action indicate a negative sentiment, then the sentiment model 116A-1 can determine that the negative sentiments are likely to be associated with the second transaction by virtue of the similarities between the second transaction and the first set of transactions.

In some implementations, the prediction model is trained to identify one or more linguistic patterns present within the different sets of transactions. For example, as shown in FIG. 1B, the linguistic model 116A-2 can be trained to identify a subset of transactions from among the first set of transactions that are determined to be associated with linguistic patterns that correspond to linguistic patterns represented by the second transaction. For example, if the linguistic patterns present within documents associated with the first set of transactions indicate a correlation with an adverse judgment, then the linguistic model 116A-2 can determine that a judgment subsequently issued for the second transaction may involve the same linguistic patterns, and therefore represent an adverse judgment.

The process 600 can include the operation of receiving data representing a particular set of one or more output parameters for the second transaction (650). For instance, the prediction module 118 of the server 110 can receive data from the prediction model that indicates a particular set of one or more output parameters for the second transaction. In the example depicted in FIG. 2, the one or more output parameters include scores representing different likelihoods of success in prevailing in a future case based on the identification data.

In other examples, the output parameters can include other types of parameters related to the predictions performed by the prediction model. For example, an output parameter can identify a presiding judge that the prediction model identifies as being is most likely to rule favorably towards a party. Another output parameter can identify a law firm that the prediction model identifies as most likely to prevail on the cause of action specified by the identification data for the second transaction. In some instances, the prediction module 118 can generate a transaction report 162 that includes multiple output parameters.

The process 600 can include the operation of providing the data representing the particular set of one or more output parameters for output (660). For instance, the prediction module 118 of the server 110 can generate a transaction report 162 and provide the transaction report 162 for output to the computing device 130. The transaction report 162 can include the particular set of one or more output parameters that were determined by the prediction model. For example, if the output parameters represent different types of predictions, the transaction report 162 provided for output can include the different types of predictions.

In some implementations, the process 600 can additionally include the operation of selecting the prediction model from among a set of prediction models based on the identification data for the second transaction. For instance, the model selector 116 of the server 110 can select a prediction model from among a set of prediction models that includes the sentiment model 116A-1, the linguistic model 116A-2, and the term model 116A-3. In such instances, each model is can be trained to output, for each of different sets of transactions, a different set of one or more of output parameters.

As examples relating to a judicial decision associated with the second transaction, the sentiment model 116A-1 can be trained to output scores representing likelihoods of certain sentiments being associated with the judicial decision, the linguistic model 116A-2 can be trained to output scores representing likelihoods of certain linguistic patterns being present in the judicial decision, and the prediction model 116A-3 can identify can be trained to identify terms that are likely to occur in the judicial decision. In other examples, each of the prediction models is trained to output a prediction related to the outcome of the second transaction, but based on a different method evaluation (i.e., evaluating sentiment, evaluating linguistic patterns, evaluating terms). In these examples, each model is trained to output the same type of output parameter (e.g., a score representing a prediction of prevailing on the merits of a case) but based on different evaluation criteria.

In some implementations, the set of prediction models can include a first prediction model that is trained to output a set of one or more output parameters that represent a predicted value for a transaction metric for the second transaction. For example, the transaction metric can represent a likelihood prevailing on the merits in the second transaction. The set of prediction models can also include a second prediction model that is trained to output a set of one or more output parameters that represent a set of predicted attributes that are descriptive of the second transaction. For example, the set of predicted attributes can include the likelihood of a summary judgment being granted, a likelihood of receiving a favorable jury decision, among others.

Figure 7:
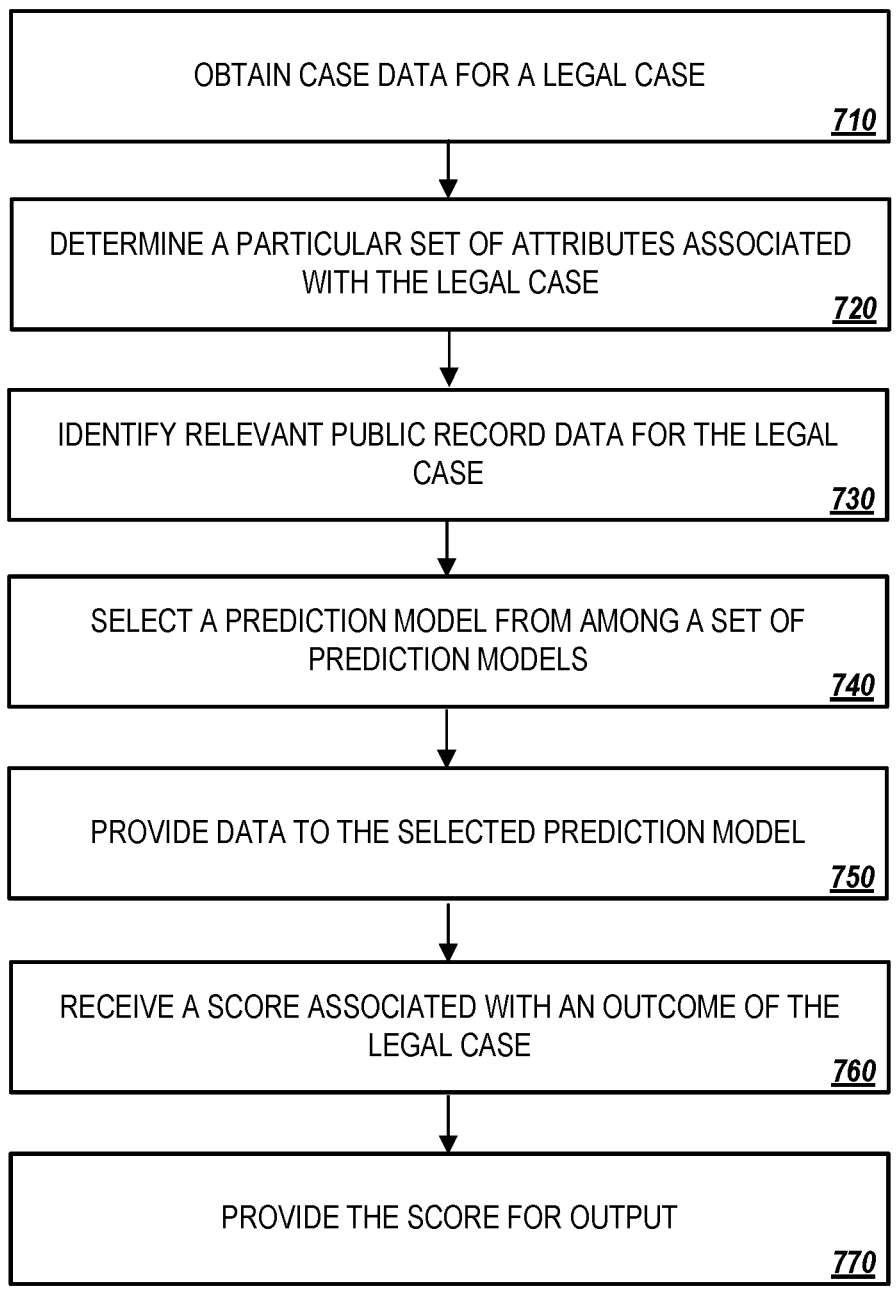
FIG. 7 illustrates an example of a process for predicting an outcome for a legal case by applying a model to evaluate unstructured transaction data.

FIG. 7 illustrates an example of a process 700 for predicting an outcome for a legal case by applying a model to evaluate unstructured transaction data. Briefly, the process 700 can include the operations of obtaining case data for a legal case (710), determining a particular set of attributes associated with the legal case (720), identifying relevant public record data for the legal case (730), selecting a prediction model from among a set of prediction models (740), providing data to the selected prediction model (750), receiving a score associated with the outcome of the legal case (760), and providing the score for output (770).

In more detail, the process 700 can include the operation of obtaining case data for a legal case (710). For instance, the data processor 114 can obtain a case query 202 that indicates an input parameter identified as impacting an outcome of the legal case and one or more entities associated with the legal case. As examples, the input parameter can include a cause of action associated with the case, a court in which the case is to be filed, or a judge to preside over the legal case, among others. Additionally, the entities associated with the legal case can include a law firm to be selected to represent a party to the legal case (e.g., defendant's legal counsel, plaintiff's legal counsel).

The process 700 can include the operation of determining a particular set of attributes associated with the legal case (720). For instance, the data processor 114 can determine attributes of the one or more entities that are specified in the case data. For example, the attributes of a law firm can include a number of attorneys, a number of cases in which the law firm represented clients with a related cause of action, a number of cases in which the law firm successfully prevailed or did not succeed in obtaining relief. In some instances, the data processor 114 can determine attributes of individual attorneys of law firms, such as a number of relevant representations, a number of years of practice experience, the types of representations involved, among others. In some other examples, attributes can be determined for other entities that may be associated with a case, such as a presiding judge, legal counsel for an adverse party, legal counsel for a co-party, co-parties or adversaries, among others.

The process 700 can include the operation of identifying relevant public record data for the legal case (730). For instance, the data processor 114 may identify public record data 204 that is relevant to the legal case and associated with the particular set of attributes of one or entities specified in the case data. The relevant public record data 204 can include only a subset of public record data obtained from multiple disparate data that includes an indicator associated with the legal case. As examples, the relevant public record data 204 can include documents from prior cases in which a law firm of interest involved in representation, documents from prior cases that were adjudicated by a judge of interest, documents of cases with similar causes of action, among others.

The process 700 can include the operation of selecting a prediction model from among a set of prediction models (740). For instance, the model selector 116 can select one or more prediction models 206 from among a set of prediction models that are each trained to output, for each of different sets of attributes, a score representing a type of predicted likelihood associated with the outcome of the legal case. The selection can be based on the type of evaluation to be performed consistent with the case query 202. For example, a prediction model trained to identify the overall likelihood of winning the legal case may be used if the case query 202 specifies a prediction relating to outcome of the legal case. In another example, a prediction model trained to likelihood of having a summary judgement motion be granted may be used if the case query 202 specifies prediction relating to grant of a summary motion in the legal case.

The process 700 can include the operation of providing data to the selected prediction model (750). For example, the prediction module 118 can provide the relevant public record data 204 as input to the selected prediction models 206. The selected prediction models 206 can be used to evaluate the presence of certain types of data trends or patterns within the relevant public record data 204, as discussed below.

The process 700 can include the operation of receiving a score associated with the outcome of the legal case (760). For instance, the prediction module 118 can receive a score specifying a particular type of predicted likelihood associated with the outcome of the legal case. As discussed throughout, in some instances, the score may represent an overall likelihood (e.g., a likelihood of prevailing on all issues presented in a case). In other instances, the score may represent a likelihood associated with a particular aspect of the case (e.g., a likelihood of prevailing in a motion filed in the case). In this sense, the score received by the prediction model 118 can be based on the type of prediction model that is selected for evaluation of the relevant public record data 204.

In some implementations, such as the example depicted in FIG. 2, the set of prediction models includes prediction models that are trained to use a particular type of statistical learning technique to recognize or identify certain data patterns and/or trends that may be present in the relevant public record data 204. For example, the sentiment model 216A-1 can be trained to identify the presence of certain sentiments in relevant documents in determining the likelihood to be represented by a computed score. In this example, if prior decisions issued by a judicial panel of interest indicates overall negative sentiments in adjudicating cases with similar factual patterns as the legal case, then the sentiment model 216A-1 can compute a score representing a low likelihood of prevailing in the legal case. As another example, the term model 216A-3 can be trained to identify the presence of certain terms in relevant documents in determining whether to use similar terms in court filings associated with the legal case. In this example, the term model 216A-3 can be applied to prior summary judgement motions to determine whether the summary judgment motions that have been granted typically use a set of frequent terms, whereas summary judgement motions that are denied use another set of frequent terms. The identified terms can then be used to determine whether a prospective summary judgement motion to be filed in the legal case is likely to be granted or denied based on the evaluation performed by the term model 216A-3.

The process 700 can include the operation of providing the score for output (770). For instance, the prediction module 118 can provide the score for output to the computing device 130. The score can be included in a case report 208 that is generated based on the evaluation of the public record data 204 by the selected prediction models 206. As discussed above, the contents of the case report 208 can vary based on the specifications provided by the case query 202. In some instances, such as the example depicted in FIG. 2, where the case query 202 specifies an overall outcome determination for prevailing in the legal case, the case report 208 can include a set of scores that specify a likelihood of success given a potential scenario (i.e., a judge assigned to the case, a law firm representing the party in the legal case, and a court in which the legal case is filed).

In some implementations, the relevant public record data 204 is identified within a database that stores structured data that is hierarchically arranged using classification labels. For example, as shown in FIG. 3, the database could store public record data using classifications labels that are arranged a manner specified by the hierarchical model 314B. In this example, the classification label "court" represents the highest level of the hierarchy, the classification label "judge" represents an intermediate level, and the classification label "cause of action" represents the lowest level of the hierarchy. These values are assigned to each of the classification labels to represent attributes of a legal case that is associated with a database record. For example, document record for a motion for summary judgement in a patent infringement case filed at a district court in Washington D.C. with Judge Doe would be assigned values "D.C. District Court," "Judge Doe," and "patent infringement" for the three classification labels discussed above.

Figure 8:
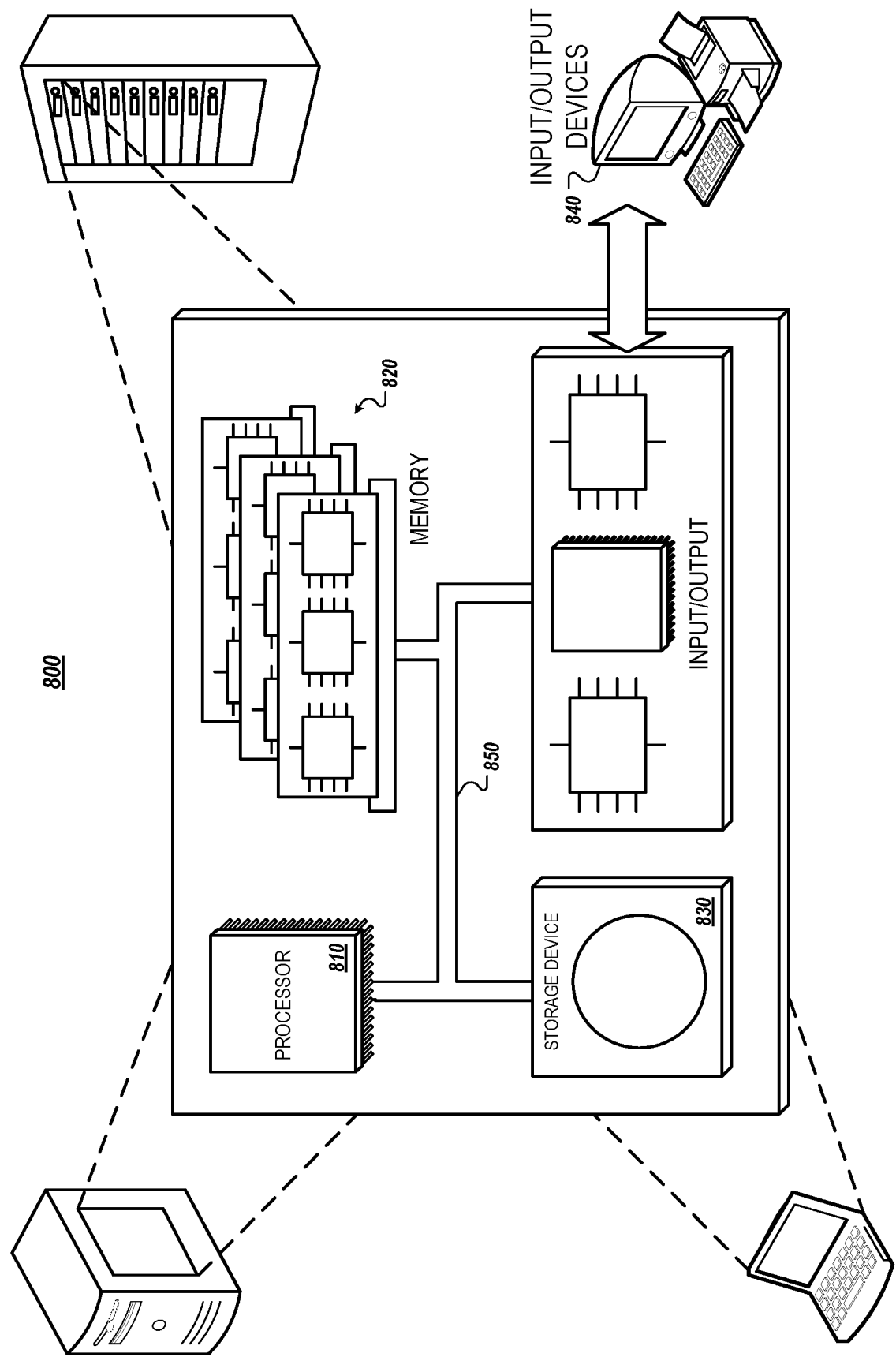
FIG. 8 is a diagram that illustrates an example of a computer system that may be applied to any of the computer-implemented methods and other techniques described herein.

FIG. 8 illustrates an example of a system 800. The system 800 can be used to carry out the operations described in association with any of the computer-implemented methods described previously, according to some implementations. In some implementations, computing systems and devices and the functional operations described in this specification can be implemented in digital electronic circuitry, in tangibly embodied computer software or firmware, in computer hardware, including the structures disclosed in this specification (e.g., system 800) and their structural equivalents, or in combinations of one or more of them. The system 800 is intended to include various forms of digital computers, such as laptops, desktops, workstations, personal digital assistants, servers, blade servers, mainframes, and other appropriate computers, including vehicles installed on base units or pod units of modular vehicles. The system 800 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 800 includes a processor 810, a memory 820, a storage device 830, and an input/output device 840. Each of the components 810, 820, 830, and 840 are interconnected using a system bus 840. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method performed by one or more computers, the method comprising:
  identifying unstructured transaction data relevant to one or more input parameters included in a set of input parameters for a data label, wherein:
    the unstructured transaction data is stored in a plurality of disparate data source systems, and
    the unstructured transaction data identifies (i) a first set of transactions predetermined to be associated with the data label, and (ii) identification data for each transaction included in the first set of transactions;
  generating structured transaction data based on applying a hierarchical data model to the unstructured transaction data obtained from the plurality of disparate data source systems, wherein:
    the hierarchical data model specifies (i) a plurality of data nodes that are each associated with a different data layer of the hierarchical data model, and (ii) a plurality of classification labels that each represent a different data type represented by the identification data, and
    the structured transaction data identifies, for each transaction included in the first set of transactions, (i) a particular classification label assigned to a transaction and (ii) a particular data node assigned to the transaction;
  determining that identification data for a second set of transactions is associated with a particular classification label that is assigned to the first set of transactions;
  providing the identification data for the second set of transactions to a prediction model trained to output, for different sets of transactions, a set of one or more output parameters that represent a prediction associated with the first set of transactions and the second set of transactions;
  receiving, from the prediction model, data representing a particular set of one or more output parameters for the second set of transactions;
  generating a prediction for the data label based on the particular set of one or more output parameters; and
  providing the data representing the prediction for the data label for output.

2. The method of claim 1, wherein:
  the prediction model is trained to identify one or more sentiments present within the different sets of transactions; and
  the particular set of one or more output parameters for the second set of transactions comprises an output parameter identifying a subset of transactions from among the first set of transactions that are determined by the prediction model to be associated with sentiments that correspond to sentiments represented by the second set of transactions.

3. The method of claim 1, wherein:
  the prediction model is trained to identify one or more linguistic patterns present within the different sets of transactions; and
  the particular set of one or more output parameters for the second set of transactions comprises an output parameter representing a subset of transactions from among the first set of transactions that are determined by the prediction model to be associated with linguistic patterns that correspond to linguistic patterns represented by the second set of transactions.

4. The method of claim 1, further comprising selecting, based on the identification data for the second set of transactions, the prediction model from among a set of prediction models that are each trained to output, for each of different sets of transactions, a different set of one or more of output parameters.

5. The method of claim 4, wherein the set of prediction models comprises:
  a first prediction model that is trained to output a set of one or more output parameters that represent a predicted value for a transaction metric for the second set of transactions; and
  a second prediction model that is trained to output a set of one or more output parameters that represent a set of predicted attributes that are descriptive of the second set of transactions.

6. The method of claim 5, wherein the prediction model comprises an artificial neural network comprising a plurality of input layers, a plurality of hidden layers, and one or more output layers.

7. The method of claim 1, wherein the prediction model comprises a convolutional neural network.

8. A system comprising:
  one or more computing devices; and
  one or more computer-readable storage devices that store executable instructions that, when executed by the one or more computing devices, cause the one or more computing devices to perform operations comprising:
    identifying unstructured transaction data relevant to one or more input parameters included in a set of input parameters for a data label, wherein:
      the unstructured transaction data is stored in a plurality of disparate data source systems, and
      the unstructured transaction data identifies (i) a first set of transactions predetermined to be associated with the data label, and (ii) identification data for each transaction included in the first set of transactions;
    generating structured transaction data based on applying a hierarchical data model to the unstructured transaction data obtained from the plurality of disparate data source systems, wherein:
      the hierarchical data model specifies (i) a plurality of data nodes that are each associated with a different data layer of the hierarchical data model, and (ii) a plurality of classification labels that each represent a different data type represented by the identification data, and
      the structured transaction data identifies, for each transaction included in the first set of transactions, (i) a particular classification label assigned to a transaction and (ii) a particular data node assigned to the transaction;

determining that identification data for a second set of transactions is associated with a particular classification label that is assigned to the first set of transactions;

providing the identification data for the second set of transactions to a prediction model trained to output, for different sets of transactions, a set of one or more output parameters that represent a prediction associated with the first set of transactions and the second set of transactions;

receiving, from the prediction model, data representing a particular set of one or more output parameters for the second set of transactions;

generating a prediction for the data label based on the particular set of one or more output parameters; and providing the data representing the prediction for the data label for output.

9. The system of claim 8, wherein: the prediction model is trained to identify one or more sentiments present within the different sets of transactions; and the particular set of one or more output parameters for the second set of transactions comprises an output parameter identifying a subset of transactions from among the first set of transactions that are determined by the prediction model to be associated with sentiments that correspond to sentiments represented by the second set of transactions.

10. The system of claim 8, wherein: the prediction model is trained to identify one or more linguistic patterns present within the different sets of transactions; and the particular set of one or more output parameters for the second set of transactions comprises an output parameter representing a subset of transactions from among the first set of transactions that are determined by the prediction model to be associated with linguistic patterns that correspond to linguistic patterns represented by the second set of transactions.

11. The system of claim 8, wherein the operations further comprise selecting, based on the identification data for the second set of transactions, the prediction model from among a set of prediction models that are each trained to output, for each of different sets of transactions, a different set of one or more of output parameters.

12. The system of claim 11, wherein the set of prediction models comprises:
a first prediction model that is trained to output a set of one or more output parameters that represent a predicted value for a transaction metric for the second set of transactions; and
a second prediction model that is trained to output a set of one or more output parameters that represent a set of predicted attributes that are descriptive of the second set of transactions.

13. The system of claim 12, wherein the prediction model comprises an artificial neural network comprising a plurality of input layers, a plurality of hidden layers, and one or more output layers.

14. The system of claim 8, wherein the prediction model comprises a convolutional neural network.

15. At least one non-transitory computer-readable storage device that stores executable instructions that, when executed by one or more computing devices, cause the one or more computing devices to perform operations comprising: identifying unstructured transaction data relevant to one or more input parameters included in a set of input parameters for a data label, wherein: the unstructured transaction data is stored in a plurality of disparate data source systems, and the unstructured transaction data identifies (i) a first set of transactions predetermined to be associated with the data label, and (ii) identification data for each transaction included in the first set of transactions; generating structured transaction data based on applying a hierarchical data model to the unstructured transaction data obtained from the plurality of disparate data source systems, wherein: the hierarchical data model specifies (i) a plurality of data nodes that are each associated with a different data layer of the hierarchical data model, and (ii) a plurality of classification labels that each represent a different data type represented by the identification data, and the structured transaction data identifies, for each transaction included in the first set of transactions, (i) a particular classification label assigned to a transaction and (ii) a particular data node assigned to the transaction; determining that identification data for a second set of transactions is associated with a particular classification label that is assigned to the first set of transactions; providing the identification data for the second set of transactions to a prediction model trained to output, for different sets of transactions, a set of one or more output parameters that represent a prediction associated with the first set of transactions and the second set of transactions; receiving, from the prediction model, data representing a particular set of one or more output parameters for the second set of transactions; generating a prediction for the data label based on the particular set of one or more output parameters; and providing the data representing the prediction for the data label for output.

16. The storage device of claim 15, wherein:
the prediction model is trained to identify one or more sentiments present within the different sets of transactions; and
the particular set of one or more output parameters for the second set of transactions comprises an output parameter identifying a subset of transactions from among the first set of transactions that are determined by the prediction model to be associated with sentiments that correspond to sentiments represented by the second set of transactions.

17. The storage device of claim 15, wherein:
the prediction model is trained to identify one or more linguistic patterns present within the different sets of transactions; and
the particular set of one or more output parameters for the second set of transactions comprises an output parameter representing a subset of transactions from among the first set of transactions that are determined by the prediction model to be associated with linguistic patterns that correspond to linguistic patterns represented by the second set of transactions.

18. The storage device of claim 15, wherein the operations further comprise selecting, based on the identification data for the second set of transactions, the prediction model from among a set of prediction models that are each trained to output, for each of different sets of transactions, a different set of one or more of output parameters.

19. The storage device of claim 18, wherein the set of prediction models comprises:
a first prediction model that is trained to output a set of one or more output parameters that represent a predicted value for a transaction metric for the second set of transactions; and
a second prediction model that is trained to output a set of one or more output parameters that represent a set of predicted attributes that are descriptive of the second set of transactions.

20. The storage device of claim 19, wherein the prediction model comprises an artificial neural network comprising a plurality of input layers, a plurality of hidden layers, and one or more output layers.

* * * * *